US010348443B2

(12) United States Patent
Kim et al.

(10) Patent No.: US 10,348,443 B2
(45) Date of Patent: Jul. 9, 2019

(54) ELECTRONIC DEVICE AND METHOD FOR CONTROLLING THE SAME

(71) Applicant: SAMSUNG ELECTRONICS CO., LTD., Suwon-si (KR)

(72) Inventors: In-beom Kim, Suwon-si (KR); Seok-hun Kang, Suwon-si (KR); Bong-su Kim, Suwon-si (KR); Soo-hong Kim, Seoul (KR); Eun-jae Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 15/673,537

(22) Filed: Aug. 10, 2017

(65) Prior Publication Data

US 2018/0102867 A1    Apr. 12, 2018

(30) Foreign Application Priority Data

Oct. 10, 2016 (KR) .................. 10-2016-0130651

(51) Int. Cl.
| | | |
|---|---|---|
| *H04L 5/04* | (2006.01) | |
| *H04J 14/08* | (2006.01) | |
| *H04J 3/24* | (2006.01) | |
| *H04L 29/06* | (2006.01) | |
| *H04B 10/80* | (2013.01) | |
| *H04J 3/10* | (2006.01) | |
| *H04L 12/24* | (2006.01) | |

(52) U.S. Cl.
CPC ............ *H04J 14/08* (2013.01); *H04B 10/801* (2013.01); *H04J 3/242* (2013.01); *H04L 69/22* (2013.01); *H04J 3/10* (2013.01); *H04J 2203/0062* (2013.01); *H04L 41/0896* (2013.01)

(58) Field of Classification Search
CPC ...... H04L 41/0896; H04L 69/22; H04J 3/242; H04J 14/08; H03M 2201/4216; H03M 2201/422; H03M 2201/526
See application file for complete search history.

(56) References Cited

U.S. PATENT DOCUMENTS

| | | | |
|---|---|---|---|
| 9,425,865 | B2 | 8/2016 | Lee et al. |
| 2010/0228995 | A1 | 9/2010 | Jacobus et al. |
| 2013/0322497 | A1 | 12/2013 | Kim et al. |
| 2016/0080208 | A1 | 3/2016 | Takemoto et al. |

FOREIGN PATENT DOCUMENTS

| | | |
|---|---|---|
| JP | 2015-197365 A | 11/2015 |
| KR | 10-2013-0135450 A | 12/2013 |
| KR | 10-1530491 B1 | 6/2015 |

*Primary Examiner* — Bo Hui A Zhu
(74) *Attorney, Agent, or Firm* — Sughrue Mion, PLLC

(57) ABSTRACT

An electronic device is provided. The electronic device includes: a first board that time-divides each of a plurality of parallel data and generates a plurality of packets corresponding to each time period based on levels of each of the plurality of parallel data included in each time period in order to convert the plurality of parallel data into serial data; and a second board that determines levels of each of the plurality of parallel data in each time period to convert the serial data into the plurality of parallel data when the serial data are received from the first board, in which the first board may convert the data into a first signal or a second signal based on the levels of the data included in each time period in order to generate the packets.

14 Claims, 9 Drawing Sheets

ELECTRONIC DEVICE AND METHOD FOR CONTROLLING THE SAME

CROSS-REFERENCE TO RELATED APPLICATIONS

This application claims priority from Korean Patent Application No. 10-2016-0130651, filed on Oct. 10, 2016 in the Korean Intellectual Property Office, the disclosure of which is incorporated herein by reference in its entirety.

BACKGROUND

Field

Apparatuses and methods consistent with the present disclosure relate to an electronic device and a method for controlling the same, and more particularly, to an electronic device for transmitting and receiving data by using serial data that includes a packet identifier and a plurality of time-divided data and a method for controlling the same.

Description of the Related Art

Recently, with the development of electronic technology, various electronic devices such as television (TV), a computer, a notebook, and a mobile phone are being developed, and the electronic devices need to process a large amount of data internally in order to meet detailed requirements of consumers.

To this end, an efficient data transmission is increasingly important in transmitting and receiving a plurality of data between boards in the electronic device.

However, when the plurality of data are transmitted and received between the boards by using a parallel cable, a transmission rate may be reduced, complicated cabling may occur, a crosstalk phenomenon by which a signal of a certain line flows into other lines may occur, and so on.

Accordingly, a method for converting parallel data into serial data and transmitting the data may be used. However, in order to restore parallel data again after transmission of serial data, an identifier capable of defining each line of the parallel data is needed.

Conventionally, a header is used as an identifier for defining each line. As a result, however, there may arise a problem that a delay time due to a header code analysis occurs when restoring the received serial data to the parallel data.

Therefore, in restoring the converted serial data to a plurality of parallel data, a method for rapidly restoring each data line without a delay time is needed.

SUMMARY

Exemplary embodiments may overcome the above disadvantages and other disadvantages not described above. However, the exemplary embodiments are not required to overcome the disadvantages described above, and an exemplary embodiment may not overcome any of the problems described above.

The present disclosure provides an electronic device for restoring serial data to a plurality of parallel data based on signals having different pulse widths included in the serial data and a method for controlling the same.

According to an aspect of one or more exemplary embodiments, an electronic device includes: a first board configured to time-divide each of a plurality of parallel data and to generate a plurality of packets that respectively correspond to a plurality of time periods based on a respective level of each of the plurality of parallel data in order to convert the plurality of parallel data into serial data; and a second board configured to determine the respective level of each of the plurality of parallel data in order to convert the serial data into the plurality of parallel data when the serial data are received from the first board, in which the first board may convert the data into a first signal or a second signal based on the levels of the data in order to generate the packets.

For each time period, the first board may convert data having a high level, i.e., higher than a threshold, from among the plurality of parallel data included in the each time period into the first signal, and convert data having a low level, i.e., lower than the threshold, into the second signal, which has a pulse width that is different from a pulse width of the first signal in the same time period.

Each of the plurality of packets may include a packet identifier generated based on a third signal that has a pulse width that is different from that of the first and second signals in the same time period.

The second board may determine packets corresponding to the each time period by using the packet identifier.

The second board may determine whether a signal of a first time period corresponds to the first signal or the second signal in order to determine a level of first data among the plurality of parallel data, and may determine whether a signal of a second time period corresponds to the first signal or the second signal in order to determine a level of second data among the plurality of parallel data.

The first and second boards may transmit and receive data by using optical communication.

The first board may include a photodiode for transmitting the serial data through the optical communication and the second board may include a photodetector for receiving the serial data through the optical communication.

According to another aspect of one or more exemplary embodiments, a method for controlling an electronic device includes: time-dividing each of a plurality of parallel data and generating a plurality of packets that respectively correspond to a plurality of time periods based on a respective level of each of the plurality of parallel data in order to convert the plurality of parallel data into serial data; and determining the respective level of each of the plurality of parallel data in order to convert the serial data into the plurality of parallel data when the serial data are received, in which in the converting into the serial data, the data may be converted into a first signal or a second signal based on the levels of the data in order to generate the packets.

In the converting into the serial data, data having a high level (i.e., higher than a threshold) from among the plurality of parallel data included in the each time period may be converted into the first signal and data having a low level (i.e., lower than the threshold) may be converted into the second signal, which has a pulse width that is different from a pulse width of the first signal in the same time period.

Each of the plurality of packets may include a packet identifier that is generated based on a third signal which has a pulse width that is different from that of the first and second signals in the same time period.

In the converting into the plurality of parallel data, the packets corresponding to the each time period may be determined by using the packet identifier.

In the converting into the plurality of parallel data, it may be determined whether a signal of a first time period among the signals included in the packets corresponding to the each time period corresponds to the first signal or the second signal in order to determine a level of first data among the plurality of parallel data and it may be determined whether a signal of a second time period among the signals included in the packets corresponding to the each time period corresponds to the first signal or the second signal in order to determine a level of second data among the plurality of parallel data.

The serial data may be transmitted/received by using optical communication.

In the transmitting of the serial data, the serial data may be transmitted through optical communication by using a photodiode, and in the receiving of the serial data, the serial data may be received through the optical communication using a photodetector.

As described above, according to various exemplary embodiments of the present disclosure, it is possible to more efficiently transmit and receive data by providing the electronic device which is capable of restoring the serial data transmitted between the boards to the plurality of parallel data without the delay time.

BRIEF DESCRIPTION OF THE DRAWINGS

The above and/or other aspects will be more apparent by describing certain exemplary embodiments with reference to the accompanying drawings, in which.

DETAILED DESCRIPTION

First, terms used in the present specification and claims are selected as general terms in consideration of functions. However, these terms may be changed based on an intention of a person in the art, legal or technical analysis, appearance of new technologies, or the like. Further, some terms may be arbitrarily selected by the present applicant. These terms may be analyzed as meaning defined in the present specification, and if terms are not defined in detail, the terms may also be analyzed based on the overall content of the present specification and general technology knowledge of the technical field in the art.

In addition, in describing the present disclosure, if it is determined that the detailed description of relevant known functions or components would cause any subject matter of the present disclosure to be obscured, the detailed description thereof will be shortened or omitted.

Further, exemplary embodiments will be described in detail with reference to the accompanying drawings and contents described in the accompanying drawings, but the present disclosure is not limited to the exemplary embodiments.

Hereinafter, an electronic device according to an exemplary embodiment will be described with reference to the accompanying drawings.

Figure 1:
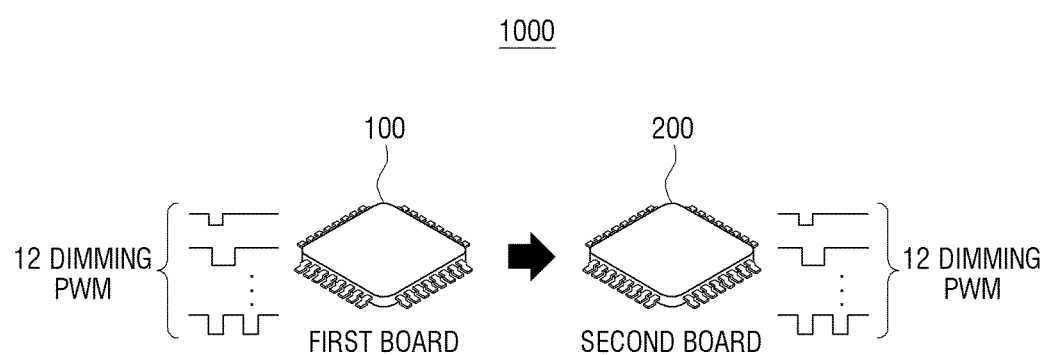
FIG. 1 is a diagram for describing an electronic device, according to an exemplary embodiment.

FIG. 1 is a diagram for describing an electronic device, according to an exemplary embodiment.

Referring to FIG. 1, an electronic device 1000 includes a first board 100 and a second board 200.

The first board 100 may convert a plurality of parallel data into serial data and transmit the serial data to the second board 200.

In this aspect, the plurality of parallel data may be data that has previously been stored in elements existing in the first board 100, and may also be data transmitted from other boards in the electronic device to the first board 100. Hereinafter, for convenience of description, a case where the plurality of parallel data is previously stored in the first board 100 will be described as an example.

First, the first board 100 may time-divide each of a plurality of parallel data in order to convert the plurality of parallel data into the serial data. In particular, the first board 100 may time-divide the plurality of parallel data by using a time division multiplexing method. Here, the time division multiplexing method is a method for assigning a plurality of parallel data into predetermined time slots. As a result, the first board 100 may multiplex one transmission communication path into a plurality of channels.

Further, the first board 100 may generate a packet corresponding to each time period based on the plurality of parallel data divided into a predetermined time period.

In this aspect, each packet that is generated may include a signal indicating a signal that is converted based on a level of the time-divided data, that is, a high level (i.e., a level that is higher than a threshold) or a low level (i.e., a level that is lower than the threshold) of the time-divided data and a signal indicating a packet identifier. In the meantime, a detailed description thereof will be provided below with reference to FIG. 2.

Thereafter, the first board 100 may convert the parallel data into the serial data by connecting the plurality of generated packets, and transmit the converted serial data to the second board 200.

To this end, the first board 100 may include a photodiode. In particular, the first board 100 may transmit the serial data to the second board 200 via optical communication by using the photodiode. Here, an optical signal used for the optical communication may include a signal that has a wavelength range that is in an infrared band to a visible light band.

The second board 200 may receive the serial data from the first board 100 and convert the received serial data into the plurality of parallel data.

First, the second board may receive the serial data from the first board 100.

To this end, the second board 200 may include a photodetector. In particular, the second board 200 may receive the serial data from the first board 100 via the optical communication by using the photodetector. Here, the optical signal used for the optical communication may include a signal that has a wavelength range that is in the infrared band to the visible light band.

Thereafter, if the serial data are received, the second board 200 may convert the serial data into the plurality of parallel data.

To this end, the second board 200 may analyze a packet included in the serial data and determine a packet that corresponds to each time period by using a packet identifier included in the packet. In particular, the second board 200 may divide each packet by using the signal of the packet identifier, and convert the serial data into the plurality of parallel data by using the signal that is converted based on the level of the time-divided data. In the meantime, a detailed description thereof will be provided below with reference to FIG. 7.

Meanwhile, although only a method for transmitting/receiving data between a first board and a second board has been described with reference to FIG. 1, the method for transmitting/receiving data as described above is not limited only to the above-described data transmission/reception between the boards. For example, the method for transmitting/receiving data described above may be used even in the case of transmitting/receiving data between a first chip and a second chip that are disposed in the board.

Figure 2:
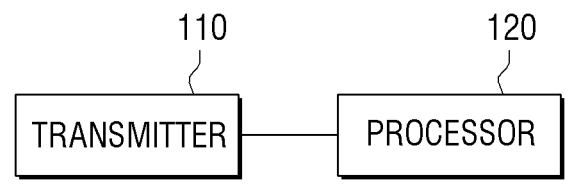
FIG. 2 is a block diagram for describing a first board, according to an exemplary embodiment.

FIG. 2 is a block diagram for describing a first board, according to an exemplary embodiment.

Referring to FIG. 2, the first board 100 according to the exemplary embodiment includes a transmitter 110 and a processor 120.

The transmitter 110 may transmit data output from an element located on the first board 100 to the second board 200.

To this end, the transmitter 110 may include a transmitting antenna that is configured for transmitting data.

Further, the transmitter 100 may include a photodiode. Accordingly, the transmitter 110 may transmit the data output from the element located on the first board 100 to the second board 200 via the optical communication. Here, the optical signal used for the optical communication may include a signal that has a wavelength range that is in the infrared band to the visible light band.

Meanwhile, the method for transmitting data via optical communication is merely an example, and therefore data may be transmitted by any of various methods, such as a method for transmitting data via other electrical lines.

The processor 120 controls a general operation of the first board 100. To this end, the processor 120 includes a central processing unit (CPU), a random access memory (RAM), and a read-only memory (ROM) and may execute operations or data processing related to a control of other components included in the first board 100.

The processor 120 may time-divide a plurality of parallel data that has previously been stored in the first board 100 and generate packets for each time period.

Here, the generated packet may include data obtained by converting the time-divided data included in each time period into the first signal or the second signal based on each level.

In particular, the processor 120 may analyze the time-divided data to convert the data into the first signal if the level of the data is high (i.e., higher than a threshold), and convert the data into the second signal if the level of the data is low (i.e., lower than the threshold).

In addition, the processor 120 may add a packet identifier generated based on the third signal which has a different pulse width from the first and second signals to each of the packets that respectively correspond to each time period.

In this regard, the first, second, and third signals will be described in detail below with reference to FIG. 3.

Figure 3:
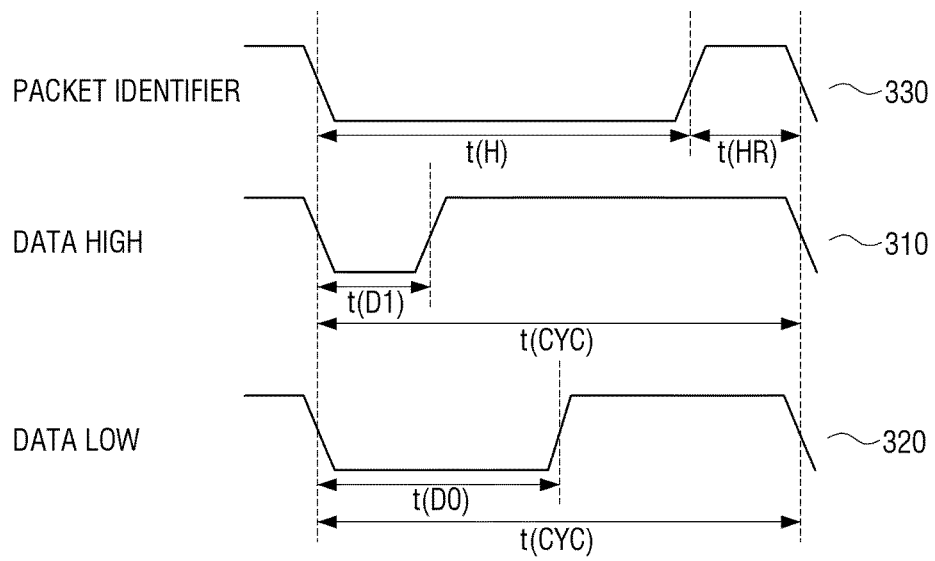
FIG. 3 is a diagram for describing a first signal, a second signal, and a third signal included in a packet, according to an exemplary embodiment.

FIG. 3 is a diagram for describing a first signal, a second signal, and a third signal, according to an exemplary embodiment.

The first signal and the second signal according to the exemplary embodiment are signals obtained by converting time-division data included in each time period.

In particular, the processor 120 may convert data into the first signal if the level of the data is high (i.e., higher than a threshold) and convert data into the second signal if the level of the data is low (i.e., lower than the threshold), in the data of each line included in each time period.

Further, the third signal according to the exemplary embodiment is a signal for identifying the packet identifier.

The first signal, the second signal, and the third signal have different pulse widths in the same time period. Here, the different pulse widths may be set by the time in order to hold the high level or the time to hold the low level.

For example, referring to FIG. 3, the processor 120 may adjust the time to hold the low level variably to set the first signal 210, the second signal 220, and the third signal 230.

In particular, a first signal 310 converted when the level of the data is high may be a signal obtained by allowing the processor 120 to set the time to hold the low level in a predetermined time period t (cyc) to be 50 (nsec) t (D1). In addition, a second signal 320 converted when the level of the data is low may be a signal obtained by allowing the processor 120 to set the time to hold the low level in a predetermined time period t (cyc) to be 100 (nsec) t (D2). Further, a third signal 330 indicating the packet identifier may be a signal obtained by allowing the processor 120 to set the time to hold the low level in the predetermined time period t (cyc) to be 150 (nsec) t (H).

Accordingly, the packet may include the third signal 330 indicating the packet identifier and the first signal 310 or the second signal 320 indicating the high or low level in the state where the third signal 330 and the first signal 310 or the second signal 320 have different pulse widths.

Hereinafter, a process of converting a plurality of parallel data into serial data and transmitting the data on the basis of the first signal 310, the second signal 320 and the third signal 330 shown in FIG. 3 will be described in detail.

Figure 4:
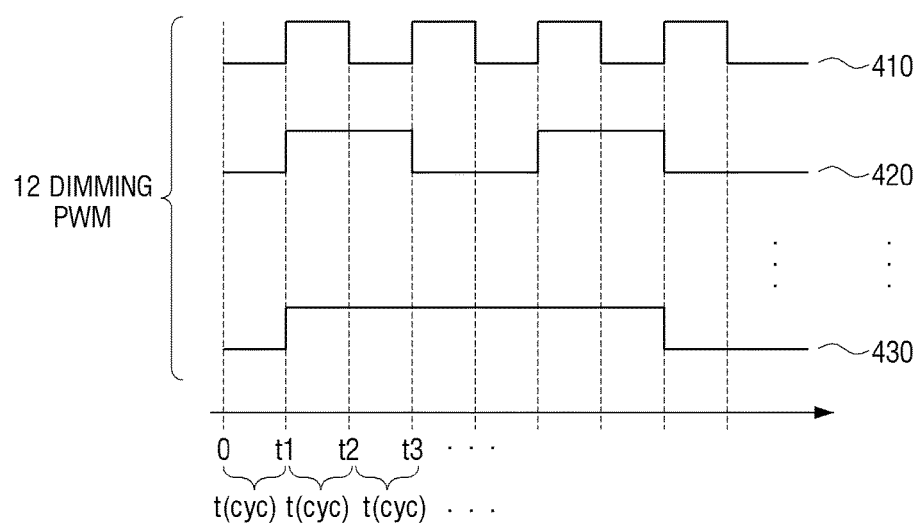
FIG. 4 is a diagram for describing a plurality of time-divided parallel data, according to an exemplary embodiment.

FIG. 4 is a diagram for describing a plurality of time divided parallel data, according to an exemplary embodiment.

First, the processor 120 may time-divide the plurality of parallel data pre-stored in the first board 100 in order to convert the plurality of parallel data into the serial data.

In particular, the processor 120 may perform the time division on a plurality of parallel data 410, 420, . . . , 430 in the same time period t (cyc) by using the time division multiplexing method.

Here, the plurality of parallel data 410, 420, . . . , 430 may be a 12-line dimming signal (PWM dimming signal) whose pulse width is modulated. However, this is only an example, and the plurality of parallel data may be variously configured as signals of 8 lines, 12 lines, 16 lines, 24 lines, or the like. Hereinafter, for convenience of explanation, a case where the plurality of parallel data 410, 420, . . . , 430 include a 12-line signal will be described as an example.

Further, the processor 120 analyzes the level of the time-divided data included in each time period.

For example, referring to FIG. 4, the processor 120 may analyze the level of the data 410 of a first line as a low level, analyze the level of the data 420 of a second line as a low level, . . . , and analyze the level of the data 430 of a twelfth line as a low level, in a period from t=0 to t=t1. Further, the processor 120 may analyze the level of the data 410 of the first line as a high level, analyze the level of the data 420 of the second line as a high level, . . . , and analyze the level of the data 430 of the twelfth line as a high level, in a period from t=t1 to t=t2. Further, the processor 120 may analyze the level of the data 410 of the first line as the low level, analyze the level of the data 420 of the second line as the high level, . . . , and analyze the level of the data 430 of the twelfth line as the high level, in a period from t=t2 to t=t3.

Further, the processor 120 may convert the time-divided data into the first signal or the second signal based on the level of the analyzed time-divided data, and generate the packet to which the third signal indicating the packet identifier is added.

This will be described below with reference to FIG. 5.

Figure 5:
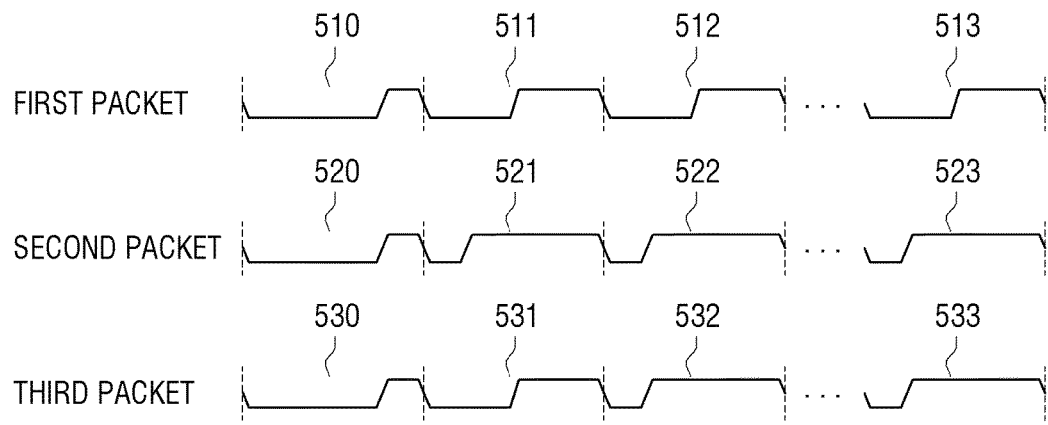
FIG. 5 is a diagram for describing a packet generated by converting time-divided data into the first signal or the second signal and adding the third signal, according to an exemplary embodiment.

FIG. 5 is a diagram for describing a packet generated by converting time-divided data into a first signal or a second signal and adding the third signal, according to an exemplary embodiment.

First, the processor 120 may convert the data 410 of the first line into a second signal 511 corresponding to a low level in the period from t=0 to t=t1 since the level of the data 410 of the first line is low in the period from t=0 to t=t1, convert the data 420 of the second line into a second signal 512 corresponding to a low level in the period from t=0 to t=t1 since the level of the data 420 of the second line is also low in the period from t=0 to t=t1, . . . , and convert the data 430 of a twelfth line into a second signal 513 corresponding to a low level in the period from t=0 to t=t1 since the level of the data 430 of a twelfth line is also low in the period from t=0 to t=t1. Further, the processor 120 may sequentially connect the signals converted by the above-described method from the first line to the twelfth line to form a first packet.

In addition, the processor 120 may add a third signal 510 having a pulse width different from that of the first signal and the second signal as the signal indicating the packet identifier to a period in which the first packet starts.

First, the processor 120 may convert the data 410 of the first line into a first signal 521 corresponding to a high level in a period from t=t1 to t=t2 since the level of the data 410 of the first line is high in the period from t=t1 to t=t2, convert the data 420 of the second line into the first signal 522 corresponding to a high level in the period from t=t1 to t=t2 since the level of the data 420 of the second line is also high in the period from t=t1 to t=t2, . . . , and convert the data 430 of a twelfth line into a first signal 523 corresponding to a high level in the period from t=t1 to t=t2 since the level of the data 430 of the twelfth line is also high in the period from t=t1 to t=t2. Further, the processor 120 may sequentially connect the signals converted by the above-described method from the first line to the twelfth line to form a second packet.

In addition, the processor 120 may add a third signal 520 having a pulse width different from that of the first signal and the second signal as the signal indicating the packet identifier to a period in which the second packet starts.

Further, the processor 120 may convert the data 410 of the first line into a second signal 531 corresponding to a low level in a period from t=t2 to t=t3 since the level of the data 410 of the first line is low in the period from t=t2 to t=t3, convert the data 420 of the second line into a first signal 532 corresponding to a high level in the period from t=t2 to t=t3 since the level of the data 420 of the second line is also high in the period from t=t2 to t=t3, . . . , and convert the data 430 of a twelfth line into a first signal 533 corresponding to a high level in the period from t=t2 to t=t3 since the level of the data 430 of the twelfth line is also high in the period from t=t2 to t=t3. Further, the processor 120 may sequentially connect the signals converted by the above-described method from the first line to the twelfth line to form a third packet.

In addition, the processor 120 may add a third signal 530 having a pulse width different from that of the first signal and the second signal as the signal indicating the packet identifier to a period in which the third packet starts.

Thereafter, the processor 120 may connect a plurality of packets and convert the packets into serial data.

Figure 6:
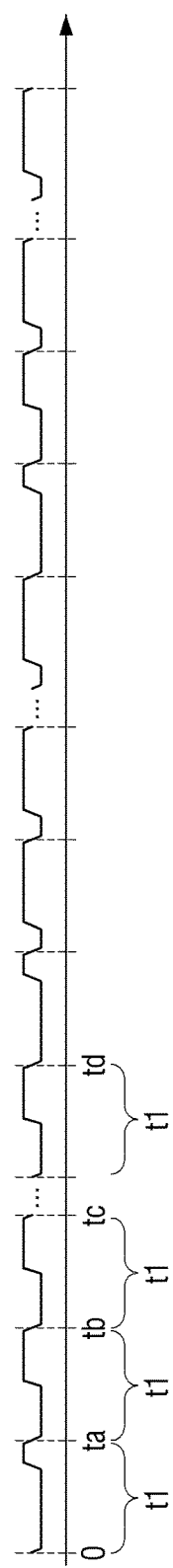
FIG. 6 is a diagram for describing a method for connecting a plurality of packets and converting the packets into serial data, according to an exemplary embodiment.

FIG. 6 is a diagram for describing a method for connecting a plurality of packets and converting the packets into serial data, according to an exemplary embodiment.

Referring to FIG. 6, the processor 120 may convert the plurality of parallel data into the serial data by connecting the plurality of packets generated by the above-described method. Here, data of a period from t=0 to t=td of the serial data may be a first packet including time-divided data of a period from t=0 to t=t1 in parallel data of 12 lines, and a packet connected after the first packet may be the second packet, . . . , and the next connected packet may be an n-th packet.

In this aspect, the processor 120 may convert a plurality of parallel data into serial data by sequentially connecting each packet from the first packet to the n-th packet.

Figure 7:
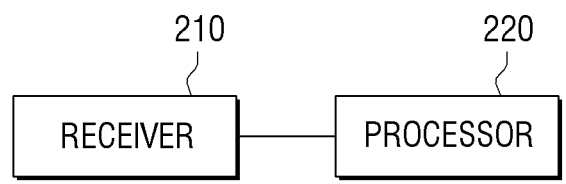
FIG. 7 is a block diagram for describing a second board, according to an exemplary embodiment.

FIG. 7 is a block diagram for describing a second board, according to an exemplary embodiment.

Referring to FIG. 7, the second board 200 according to the exemplary embodiment includes a receiver 210 and a processor 220.

The receiver 210 receives data output from the first board 100.

To this end, the receiver 210 may include a receiving antenna which is configured for receiving data.

Further, the second board 200 may include a photodetector. In particular, the second board 200 may receive the serial data from the first board 100 via the optical communication by using the photodetector. Here, the optical signal used for the optical communication may include a signal that has a wavelength range that is in the infrared band to the visible light band.

Meanwhile, the method for receiving data via optical communication is merely an example, and therefore data may be transmitted by any of various methods, such as a method for receiving data via other electrical lines.

The processor 220 controls a general operation of the second board 200. To this end, the processor 220 includes a central processing unit (CPU), a random access memory (RAM), and a read-only memory (ROM) and may execute operations or data processing related to a control of other components included in the second board 200.

Further, the processor 220 may control the receiver 210 to receive the data transmitted from the first board 100.

Thereafter, if the second board 200 receives the serial data from the first board, the processor 220 determines the level of each of the plurality of parallel data in each time period and converts the serial data into the plurality of parallel data.

In this regard, the method for converting serial data received by a second board 200 into a plurality of time-divided parallel data will be described in detail below with reference to FIG. 8.

Figure 8:
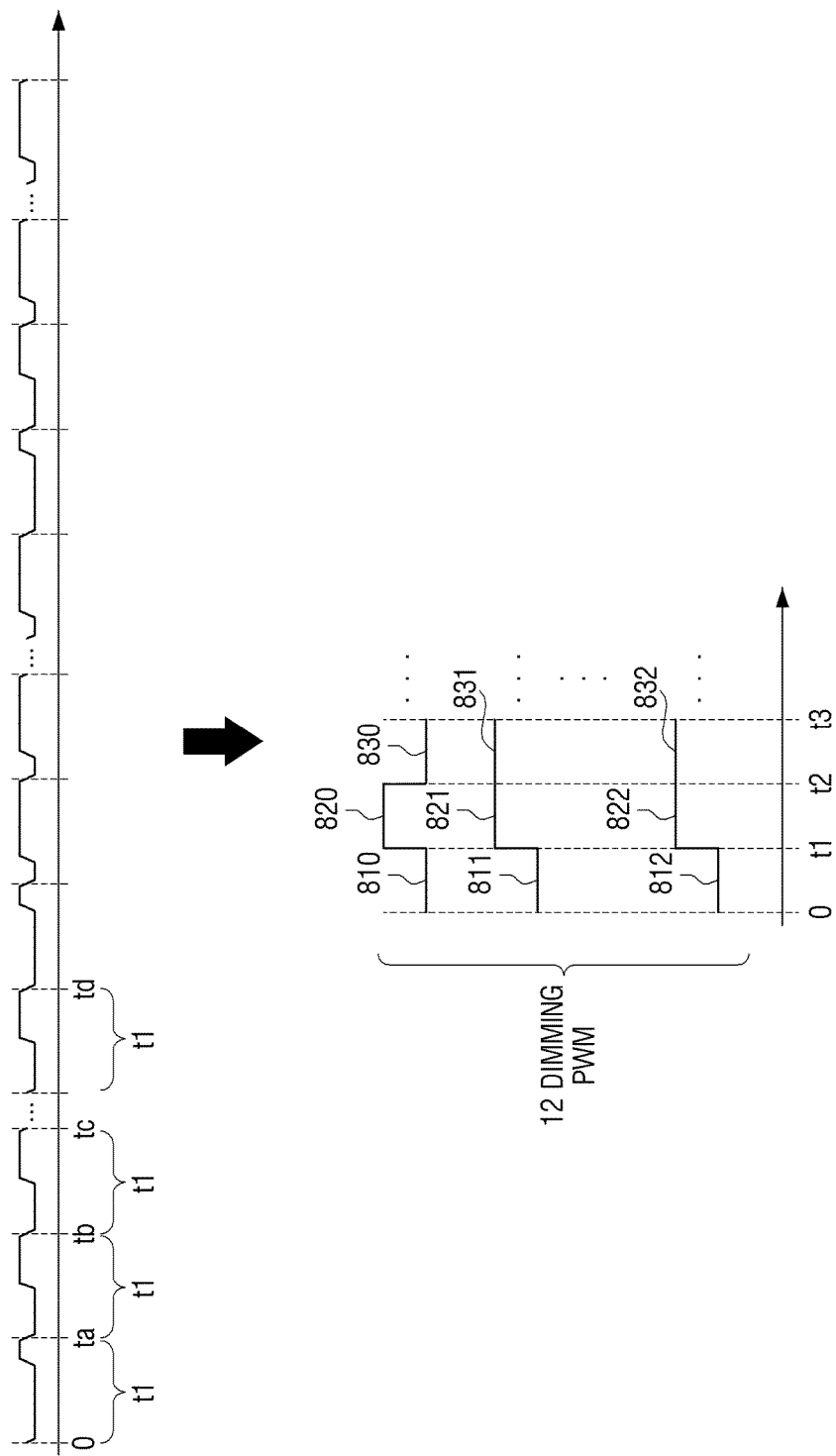
FIG. 8 is a diagram for describing a method for converting serial data into a plurality of parallel data, according to an exemplary embodiment.

FIG. 8 is a diagram for describing a method for converting serial data into a plurality of parallel data, according to an exemplary embodiment.

Referring to FIG. 8, the serial data including the first packet, the second packet, the third packet, and the like are received by the second board.

First, the processor 220 may determine the packets that correspond to each time period by using the packet identifier included in the received serial data.

In particular, in analyzing the packets included in the serial data, the processor 220 may analyze the signals included in the packets by time-divided time unit (t1) and determine that a new packet starts when the third signal is analyzed. For example, in analyzing the serial data in which each packet from the first packet to the n-th packet is sequentially connected, the processor 220 may analyze signals in a period from t=0 to t=ta at the beginning. Further, the processor 220 may determine that the first packet starts because the signal of the period from t=0 to t=ta is a third signal.

Thereafter, the processor 220 sequentially analyzes the signals included in the serial data.

In this aspect, the processor 220 determines the signal analyzed after the third signal as a signal corresponding to the data of the first line among the plurality of parallel data included in the time period (i.e., the period from t=0 to t=t1) corresponding to the first packet.

More specifically, the processor 220 may determine a time period analyzed after the third signal as a first time period (i.e., a period from t=ta to t=tb). Further, the processor 220 may determine whether the signal of the first time period corresponds to the first signal or the second signal to determine the level of the data of the first line among the plurality of parallel data.

In addition, the processor 220 may determine a time period analyzed after the first time period as a second time period (i.e., a period from t=tb to t=tc). Further, the processor 220 may determine whether the signal of the second time period corresponds to the first signal or the second signal to determine the level of the data of the second line among the plurality of parallel data.

In this manner, the processor 220 determines whether the data included in each time period is a first signal or a second signal in each time period to determine the level of data of each line of the plurality of parallel data.

Further, the processor 220 may restore the serial data to the plurality of parallel data based on the level of the data determined in each time period.

For example, referring to FIG. 8, the processor 220 restores low data corresponding to the second signal to a first line 810, since the signal of the first time period (i.e., the period from t=ta to t=tb) is the second signal. Further, the processor 220 restores low data corresponding to the second signal to a second line 811, since the signal of the second time period (i.e., the period from t=tb to t=tc) is the second signal. In a similar manner, the processor 220 may analyze the signal of each time period in each period t1 to restore high or low data to the corresponding line.

In addition, if the third signal is again analyzed during the process of analyzing the signals sequentially included in the serial data, the processor 220 may determine that the second packet connected after the first packet starts. In particular, the processor 220 determines the signal analyzed after the third signal as the data of the first line among the plurality of parallel data included in the time period (i.e., the period from t=t1 to t=t2) corresponding to the second packet. Further, if the corresponding data are analyzed to be determined as the first signal, the processor 220 may restore the high level corresponding to the first signal to the first line 820 of the time period (i.e., the period from t=t1 to t=t2) corresponding to the second packet. In a similar manner, the processor 220 may analyze the signal of each time period in each period t1 to restore high or low data to the corresponding line.

Accordingly, the processor 220 may convert the serial data received from the first board 100 into the plurality of parallel data by repeating the above-described process.

Accordingly, unlike the case of using a general header, the second board 200 may immediately sequentially output the plurality of time-divided parallel data without the delay time from the first data line.

Figure 9:
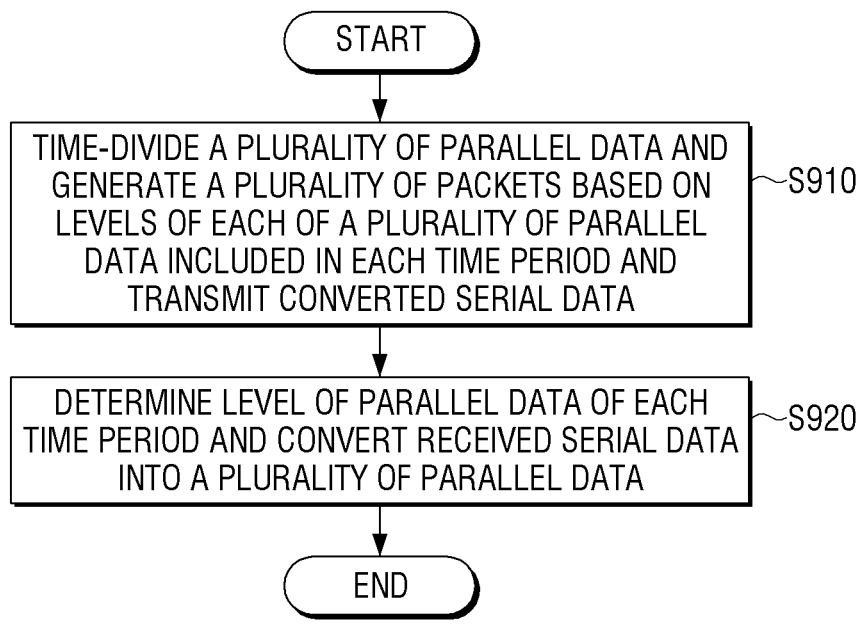
FIG. 9 is a flow chart for describing a method for controlling an electronic device, according to an exemplary embodiment.

FIG. 9 is a flow chart for describing a method for transmitting/receiving data, according to an exemplary embodiment.

First, in operation S910, the first board time-divides the plurality of parallel data, and generates the plurality of packets based on the level of each of the plurality of parallel data included in each time period, and transmits the converted serial data to the second board.

In this aspect, the generated packet may include the third signal indicating the packet identifier for determining a packet that corresponds to each time period, and may also include the first signal or the second signal converted based on the levels of each of the plurality of parallel data.

Thereafter, in operation S920, the second board determines the level of parallel data of each time period from the received serial data and converts the serial data into the plurality of parallel data.

In particular, each packet is identified by using the third signal, and it is determined whether the data included in the serial data are data having a high level or data having a low level in the plurality of parallel data by using the first signal or the second signal.

In this aspect, a detailed description of restoring the serial data to the plurality of parallel data by using the first signal, the second signal, and the third signal has been described above, and therefore will not be described herein.

Further, a non-transitory computer readable medium in which a program sequentially performing the setting method according to the present disclosure is stored may be provided.

The non-transitory computer readable medium is not a medium that stores data transitorily, such as a register, a cache, and a memory, but instead refers to a medium that semi-permanently stores data and is readable by a device. In detail, programs related to the method for transmitting/receiving data described above may be stored and provided in the non-transitory computer readable medium, such as, for example, any of a compact disk (CD), a digital versatile disk (DVD), a hard disk, a Blu-ray disk, a universal serial bus (USB), a memory card, a read-only memory (ROM), or the like.

Although exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the disclosure as disclosed in the accompanying claims. These modifications should also be understood to fall within the scope of the present disclosure.

What is claimed is:
1. An electronic device, comprising:
 a first board configured to time-divide each of a plurality of parallel data and to generate a plurality of packets that respectively correspond to a plurality of time periods based on a respective level of each of the plurality of parallel data in order to convert the plurality of parallel data into serial data; and a second board configured to determine the respective level of each of the plurality of parallel data in order to convert the serial data into the plurality of parallel data when the serial data are received from the first board, wherein the first board is further configured to convert each of the plurality of parallel data into one from among a first signal and a second signal based on the levels of each of the plurality of parallel data in order to generate the packets.

2. The electronic device as claimed in claim 1, wherein for each time period from among the plurality of time periods, the first board is further configured to convert data that has a level that is higher than a threshold from among the plurality of parallel data included in the each time period into the first signal and to convert data that has a level that is lower than the threshold from among the plurality of parallel data included in the each time period into the second signal, and wherein for the each time period, the second signal has a pulse width that is different from a pulse width of the first signal.

3. The electronic device as claimed in claim 1, wherein each of the plurality of packets includes a packet identifier generated based on a third signal that has a pulse width that is different from each of a pulse width of the first signal and a pulse width of the second signal.

4. The electronic device as claimed in claim 3, wherein the second board is further configured to determine at least one packet from among the plurality of packets that corresponds to each time period by using the packet identifier.

5. The electronic device as claimed in claim 4, wherein the second board is further configured to determine whether a signal of a first time period from among the plurality of time periods corresponds to the first signal or the second signal in order to determine a level of first data from among the plurality of parallel data, and to determine whether a signal of a second time period from among the plurality of time periods corresponds to the first signal or the second signal in order to determine a level of second data from among the plurality of parallel data.

6. The electronic device as claimed in claim 1, wherein each of the first board and the second board is further configured to transmit and receive data by using optical communication.

7. The electronic device as claimed in claim 6, wherein the first board includes a photodiode that is configured for transmitting the serial data via the optical communication, and the second board includes a photodetector that is configured for receiving the serial data via the optical communication.

8. A method for controlling an electronic device, comprising:

time-dividing each of a plurality of parallel data and generating a plurality of packets that respectively correspond to a plurality of time periods based on a respective level of each of the plurality of parallel data in order to convert the plurality of parallel data into serial data; and determining the respective level of each of the plurality of parallel data in order to convert the serial data into the plurality of parallel data when the serial data are received, wherein the generating the plurality of packets comprises converting each of the plurality of parallel data into one from among a first signal and a second signal based on the levels of each of the plurality of parallel data.

9. The method as claimed in claim 8, wherein for each time period from among the plurality of time periods, data that has a level that is higher than a threshold from among the plurality of parallel data included in the each time period is converted into the first signal and data that has a level that is lower than the threshold from among the plurality of parallel data included in the each time period is converted into the second signal, and wherein for the each time period, the second signal has a pulse width that is different from a pulse width of the first signal.

10. The method as claimed in claim 8, wherein each of the plurality of packets includes a packet identifier generated based on a third signal that has a pulse width that is different from each of a pulse width of the first signal and a pulse width of the second signal.

11. The method as claimed in claim 10, further comprising determining at least one packet from among the plurality of packets that corresponds to each time period by using the packet identifier.

12. The method as claimed in claim 11, further comprising determining whether a signal of a first time period from among the plurality of time periods corresponds to the first signal or the second signal in order to determine a level of first data from among the plurality of parallel data, and determining whether a signal of a second time period from among the plurality of time periods corresponds to the first signal or the second signal in order to determine a level of second data from among the plurality of parallel data.

13. The method as claimed in claim 8, wherein the serial data are transmitted and received by using optical communication.

14. The method as claimed in claim 13, wherein the serial data are transmitted via optical communication by using a photodiode, and the serial data are received via the optical communication by using a photodetector.

* * * * *